UNITED STATES PATENT OFFICE.

OSCAR O. B. FROELICH, OF JERSEY CITY, NEW JERSEY.

DOUBLE SALTS OF ANTIMONY.

SPECIFICATION forming part of Letters Patent No. 532,150, dated January 8, 1895.

Application filed March 6, 1894. Serial No. 502,564. (No specimens.)

*To all whom it may concern:*

Be it known that I, OSCAR O. B. FROELICH, a resident of Jersey City, Hudson county, and State of New Jersey, have discovered certain new and useful Double Salts of Antimony—namely, the compounds of fluorid of antimony ($SbFl_3$) with the oxalates of antimony and alkali used as mordants for dyeing purposes—of which the following is a specification.

My invention consists broadly in a new compound consisting of a double salt of fluorid and oxalate of antimony and alkali.

Up to the present time the only known compounds of fluorid of antimony are either with the sulfates, or fluorids or chlorids of alkalies. I have succeeded in combining the fluorid of antimony with other antimony salts, the acid of which is oxalic acid, an organic acid, as such, and for other reasons later mentioned, is much preferable to mineral acids.

These new compounds generally contain, according to analyses, one molecule of fluorid of antimony to one molecule of oxalic acid.
Therefore the different known oxalates, the formulas of which have from one to five molecules of oxalic acid to one molecule of antimony (SbO) are able to combine with fluorid of antimony molecule for molecule.

The chemical constitution of some of these new compounds is as follows:

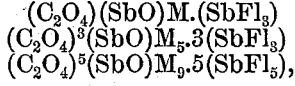

$$(C_2O_4)(SbO)M.(SbFl_3)$$
$$(C_2O_4)^3(SbO)M_5.3(SbFl_3)$$
$$(C_2O_4)^5(SbO)M_9.5(SbFl_5),$$

having a percentage of sixty-five to sixty-six per cent. antimony oxid and lower, according to the percentage of antimony oxid of the oxalate applied for combination. In these formulæ M represents the alkali metal, which of course includes ammonium.

These compounds are well formed crystals, readily and completely soluble in warm water, and on account of their composition show, when applied as mordant, in a more pronounced manner all the good qualities of the double oxalate of antimony and potash $(C_2O_4)^3SbOK_3H_2+aq.$, which, according to authorities, gives results equal to those of tartar emetic, although containing only about half the percentage of antimony oxid. This arises from the fact that oxalic acid separates quicker and more completely from the latter.

These new compounds contain more than double the quantity of antimony oxid than is contained in oxalate of antimony and more than in tartar emetic and many other antimony salts which are in use at present, develop less free hydrofluoric acid, are therefore not so injurious to the fibers and transfer the oxid quicker and more completely to tannic acid on the fiber, being thus a pronounced improvement over other compounds.

These compounds may be variously produced by various methods, some of which are as follows, it being understood that I in no sense limit myself to any specific method, stating forth these merely as examples of some specific methods of forming my improved double salts: I saturate a mixture of hydrofluoric acid and oxalic acid, in the proportion of three molecules of hydrofluoric acid (HFl) to one molecule of oxalic acid $(C_2O_4H_2)$, gradually adding alkalies to the boiling mixture, until neutralized, that is, until antimony oxid commences to precipitate. I then filter the solution and cool down to crystallization. In practice I take about sixty pounds of antimony oxid, thirty-six pounds of hydrofluoric acid of fifty per cent. (HFl,) thirty-six pounds of oxalic acid crystals, and twenty-eight pounds hydrate of potash, which yield about one hundred and twenty pounds fine soluble crystals containing about fifty per cent. antimony oxid. These specific proportions, as well as the proportions later specified, may, however, be varied without departing from the spirit of my invention.

Although my improved compound may be made as above, I prefer to make solutions in water of fluorid of antimony ($SbFl_3$) and of oxalate of antimony and alkali, all prepared separately after known methods, and to combine these afterward always, by preference, in the proportion of one molecule of oxalic acid to three molecules of hydrofluoric acid. A surplus of fluorid, however, does no harm, as it is only essential for getting completely soluble crystals to have the solutions as neutral as possible without precipitating antimony oxid. The mixed solutions on cooling down and further evaporation, yield almost theoretical quantities of small but well-formed glittering crystals in fine needles or columns. For instance, ten pounds hydrofluoric acid fifty per cent. saturated with ($Sb_2O_3$) (equal to about fifteen pounds fluorid of antimony) mixed with a neutralized solution of ten pounds binoxalate of potash saturated with ($Sb_2O_3$) (equal to about one and one-third pounds oxalate of antimony), yield about twenty-five pounds fine soluble crystals.

Having now described my invention, what I claim is—

As a new antimony mordant, the soluble compound of fluorid of antimony ($SbFl_3$) with a double oxalate of antimony and alkali, substantially as described.

OSCAR O. B. FROELICH.

Witnesses:
HARRY M. TURK,
GEO. E. MORSE.